United States Patent
Gopal et al.

(10) Patent No.: US 11,531,542 B2
(45) Date of Patent: *Dec. 20, 2022

(54) ADDITION INSTRUCTIONS WITH INDEPENDENT CARRY CHAINS

(71) Applicant: Intel Corporation, Santa Clara, CA (US)

(72) Inventors: Vinodh Gopal, Westborough, MA (US); James D. Guilford, Northborough, MA (US); Gilbert M. Wolrich, Framingham, MA (US); Wajdi K. Feghali, Boston, MA (US); Erdinc Ozturk, Marlborough, MA (US); Martin G. Dixon, Portland, OR (US); Sean P. Mirkes, Beaverton, OR (US); Matthew C. Merten, Hillsboro, OR (US); Tong Li, Portland, OR (US); Bret L. Toll, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,361

(22) Filed: Aug. 3, 2021

(65) Prior Publication Data

US 2021/0365264 A1     Nov. 25, 2021

Related U.S. Application Data

(63) Continuation of application No. 13/993,483, filed as application No. PCT/US2011/066941 on Dec. 22, 2011, now Pat. No. 11,080,045.

(51) Int. Cl.
*G06F 9/30* (2018.01)
*G06F 9/38* (2018.01)

(52) U.S. Cl.
CPC ........ *G06F 9/3001* (2013.01); *G06F 9/30094* (2013.01); *G06F 9/3838* (2013.01)

(58) Field of Classification Search
CPC ........... G06F 9/3001; G06F 9/00–3897; G06F 9/30094; G06F 9/3857; G06F 9/3838
See application file for complete search history.

(56) References Cited

U.S. PATENT DOCUMENTS

| | | | |
|---|---|---|---|
| 5,423,052 A * | 6/1995 | Oonishi | G06F 7/57 712/36 |
| 5,813,045 A | 9/1998 | Mahalingaiah et al. | |

(Continued)

FOREIGN PATENT DOCUMENTS

| | | |
|---|---|---|
| CN | 1508674 A | 6/2004 |
| CN | 1512317 A | 7/2004 |

(Continued)

OTHER PUBLICATIONS

Notice On Grant Of Patent Right For Invention, CN App. No. 201710828668.9, dated Jan. 25, 2022, 4 pages (2 pages of English Translation and 2 pages of Original Document).

(Continued)

*Primary Examiner* — Keith E Vicary
(74) *Attorney, Agent, or Firm* — Nicholson De Vos Webster & Elliott LLP

(57) ABSTRACT

A number of addition instructions are provided that have no data dependency between each other. A first addition instruction stores its carry output in a first flag of a flags register without modifying a second flag in the flags register. A second addition instruction stores its carry output in the second flag of the flags register without modifying the first flag in the flags register.

18 Claims, 12 Drawing Sheets

(56) References Cited

U.S. PATENT DOCUMENTS

| | | | |
|---|---|---|---|
| 5,960,012 | A | 9/1999 | Spracklen |
| 6,047,369 | A | 4/2000 | Colwell et al. |
| 6,157,995 | A | 12/2000 | Asato |
| 7,017,026 | B2 | 3/2006 | Yoaz et al. |
| 7,293,056 | B2 | 11/2007 | Sheaffer |
| 8,549,264 | B2 | 10/2013 | Gopal et al. |
| 11,080,045 | B2 * | 8/2021 | Gopal ............... G06F 9/3001 |
| 2004/0123076 | A1 | 6/2004 | Sheaffer |
| 2008/0059759 | A1 | 3/2008 | Sachs |
| 2011/0145543 | A1 | 6/2011 | Damron |

FOREIGN PATENT DOCUMENTS

| | | |
|---|---|---|
| CN | 1963746 A | 5/2007 |
| CN | 1320450 C | 6/2007 |
| CN | 101023675 A | 8/2007 |
| CN | 102103486 A | 6/2011 |
| TW | I242122 B | 10/2005 |

OTHER PUBLICATIONS

Office Action, CN App. No. 201710828668.9, dated Nov. 15, 2021, 5 pages of Original Document Only.

Final Office Action, U.S. Appl. No. 13/993,483, dated Jul. 22, 2020, 16 pages.

First Office Action for CN Application No. 201180075816.5, dated Nov. 16, 2015, 14 pages.

Google Groups (Re: Russian Elbrus-8S and upcoming Elbrus-16 CPU); comp.arch; 2016; 7 total pages (Year: 2016).

Intel (Intel Architecture Instruction Set Extensions Programming Reference); Ref #319433-013b; Jul. 2012, 6 total pages included.

Non-Final Office Action, U.S. Appl. No. 13/993,483, dated Mar. 9, 2020, 16 pages.

Notice of Allowance, U.S. Appl. No. 13/993,483, dated Mar. 24, 2021, 7 pages.

Notice of Allowance, U.S. Appl. No. 13/993,483, dated Apr. 8, 2021, 2 pages.

Notice of Allowance, U.S. Appl. No. 13/993,483, dated Jul. 6, 2021, 2 pages.

Office Action, CN App. No. 201710828668.9, dated Jun. 7, 2021, 7 pages of Original Document Only.

Office Action, CN App. No. 201710828668.9, dated Nov. 3, 2020, 6 pages of Original Document only.

OpenGL (uaddCarry—OpenGL 4 Shading Language Reference Pages)—2013, 1 page; accessed on Nov. 13, 2015 at https://www.opengl.org/sdk/docs/manglsl/docbook4/xhtml/uaddCarry.xml.

Ozturk et al. (Large Integer Squaring on Intel Architecture Processors); Intel White Paper—13 total pages; Jan. 2013.

Ozturk et al. (New Instructions Supporting Large Integer Arithmetic on Intel Architecture Processors); Intel White Paper—16 total pages; Aug. 2012.

Patterson et al. (Computer Organization and Design—The Hardware/Software Interface)—Third Edition—2005—10 total pages included.

PCT International Search Report for PCT Counterpart Application No. PCT/US2011/066941, 3pgs., (dated Jul. 27, 2012).

PCT Notification concerning Transmittal of International Preliminary Report on Patentability (Chapter I of the Patent Cooperation Treaty) for PCT Counterpart Application No. PCT/US2011/066941, 7 pgs., (dated Jul. 3, 2014).

PCT Written Opinion of the International Searching Authority for PCT Counterpart Application No. PCT/US2011/066941, 5 pgs., (dated Jul. 27, 2012).

Peleg, A., et al. "MMX Technology Extension to the Intel Architecture", IEEE Micro Magazines, Aug. 1996, pp. 42-50, vol. 16, No. 4.

Search Report for Taiwan (R.O.C.) Patent Application No. 101143930, dated Aug. 15, 2014, 2 pages.

Second Office Action for CN Application No. 201180075816.5, dated Sep. 23, 2016, 17 pages.

Skybuck (Parallel execution of carry dependent instructions)—comp.arch, 2008; 12 total pages; accessed on Nov. 13, 2015 at http://compgroups.net/comp.arch/parallel-execution-of-carry-dependent-instructions/205019.

Non-Final Office Action, U.S. Appl. No. 17/496,632, dated Sep. 29, 2022, 16 pages.

\* cited by examiner

```
SAMPLE CODE 300
XOR    rax, rax

MULX   rax, rbx, B[0]
ADCX   x0, x0, rbx
ADOX   x1, x1, rax

MULX   rax, rbx, B[1]
ADCX   x1, x1, rbx
ADOX   x2, x2, rax

MULX   rax, rbx, B[2]
ADCX   x2, x2, rbx
ADOX   x3, x3, rax
.....
```

ADDITION INSTRUCTIONS WITH INDEPENDENT CARRY CHAINS

CROSS-REFERENCE TO RELATED APPLICATIONS

The present patent application is a continuation application claiming priority from U.S. patent application Ser. No. 13/993,483, filed Jun. 12, 2013 and entitled "Addition Instructions with Independent Carry Chains," now U.S. Pat. No. 11,080,045, which is a U.S. National Phase Application under 35 U.S.C. § 371 of International Application No. PCT/US2011/066941, filed Dec. 22, 2011 and entitled "Addition Instructions with Independent Carry Chains," each of which is incorporated herein by reference in its entirety.

FIELD OF THE INVENTION

Embodiments of the invention relate generally to computer processor architecture, and, more specifically, to instructions which when executed cause a particular result.

DESCRIPTION OF THE RELATED ART

Addition instructions are commonly included in instruction set architectures (ISAs). A large number of addition operations often arise in multiplications. For example, public key cryptography typically involves long integer arithmetic that needs multi-precision multiplication. These operations such as modular exponentiation are highly computationally intensive and involve a large number of additions. A server that is responsible for setting up secure socket layer (SSL) transactions for an enterprise may receive a large number of connection requests from the enterprise clients in a short time span. Each transaction involves cryptographic operations that include a large number of integer multiplications and additions. Inefficient addition operations can slow down the overall performance.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

In the following description, numerous specific details are set forth. However, it is understood that embodiments of the invention may be practiced without these specific details. In other instances, well-known circuits, structures and techniques have not been shown in detail in order not to obscure the understanding of this description.

Embodiments of the invention provide a mechanism for efficiently adding long integers. In particular, embodiments of the invention provide a mechanism for efficiently multiplying a large number of long integers in parallel with addition operations.

Figure 1:
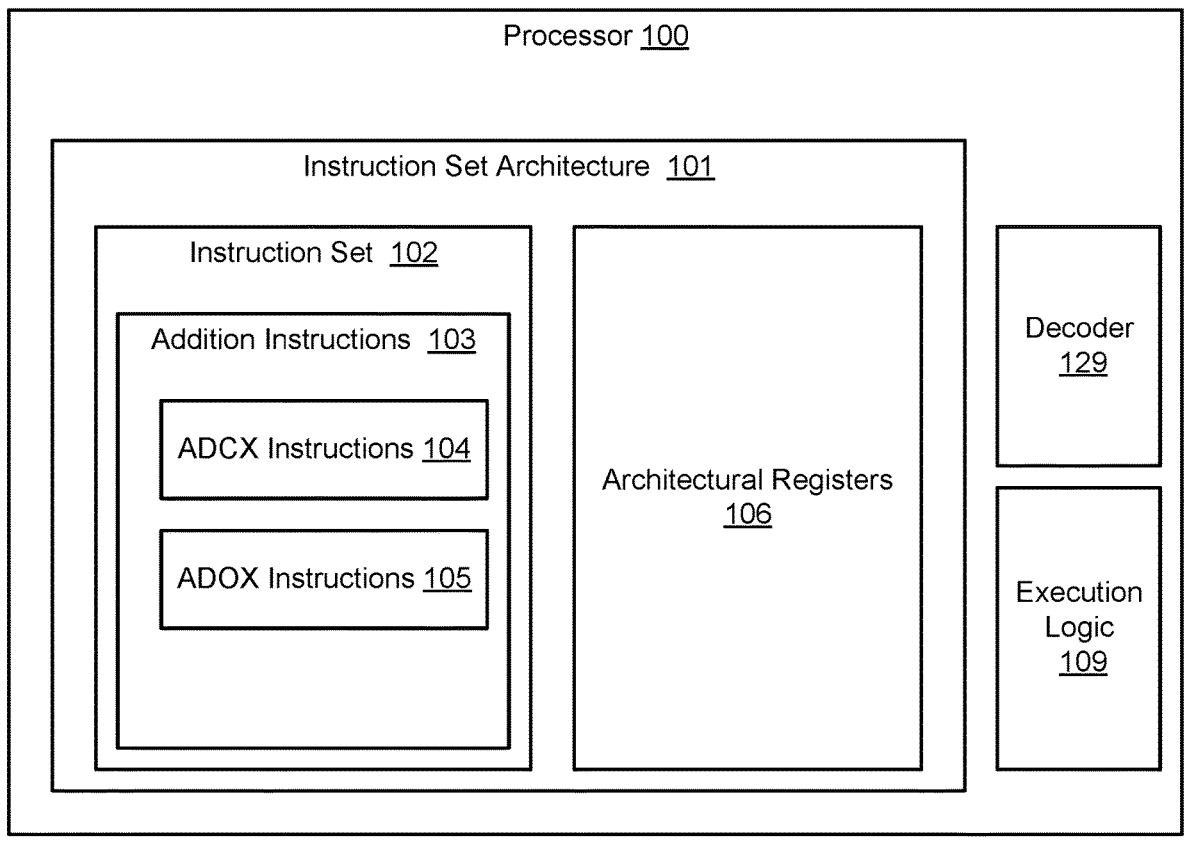
FIG. 1 is a block diagram of an example embodiment of a processor having an instruction set including one or more addition instructions.

FIG. 1 is a block diagram of an example embodiment of a processor 100. The processor 100 may be any of various complex instruction set computing (CISC) processors, various reduced instruction set computing (RISC) processors, various very long instruction word (VLIW) processors, various hybrids thereof, or other types of processors entirely. In one or more embodiments, the processor 100 may be a general-purpose processor (e.g., a general-purpose microprocessor of the type manufactured by Intel Corporation, of Santa Clara, Calif.), although this is not required. Alternatively, the instruction processing apparatus may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples.

The processor 100 has an instruction set architecture (ISA) 101. The instruction set architecture 101 represents the part of the architecture of the processor 100 related to programming. The instruction set architecture 101 commonly includes the native instructions, architectural registers, data types, addressing modes, memory architecture, interrupt and exception handling, and external input and output (I/O) of the processor 100. The instruction set architecture 101 is distinguished from the microarchitecture, which generally represents the particular processor design techniques selected to implement the instruction set architecture. Processors with different microarchitectures may share a common instruction set architecture. For example, certain microprocessors by Intel Corporation, of Santa Clara, Calif., and certain microprocessors of Advanced Micro Devices, Inc. of Sunnyvale, Calif., use substantially different internal microarchitectures to implement similar portions of the x86 instruction set.

The instruction set architecture 101 includes architectural registers (e.g., an architectural register file) 106. In one embodiment, the architectural registers 106 include general purpose (GP) registers, flags registers, vector registers, write mask registers, scalar floating-point registers, and other registers. The architectural registers 106 represent on-board processor storage locations. The architectural registers 106 may also be referred to herein simply as registers. Unless otherwise specified or clearly apparent, the phrases architectural register, register file, and register are used herein to refer to registers that are visible to the software and/or programmer (e.g., software-visible) and/or the registers that are specified by macroinstructions to identify operands. These registers 106 are contrasted to other non-architectural registers in a given microarchitecture (e.g., temporary registers, reorder buffers, retirement registers, etc.).

The illustrated instruction set architecture 101 also includes an instruction set 102 that is supported by the processor 100. The instruction set 102 includes several different types of instructions. These instructions of the instruction set 102 represent macroinstructions (e.g., instructions provided to the processor 100 for execution), as opposed to microinstructions or micro-ops (e.g., which result from a decoder 129 of the processor 100 decoding macroinstructions).

In one embodiment, the instruction set 102 includes one or more addition instructions 103 (e.g., an ADCX instruction 104 and an ADOX instruction 105) that are operable to cause or result in the processor 100 adding two operands (e.g., two quadwords (Qwords), two doublewords (Dwords), or two operands of other data widths). The ADCX 104 and the ADOX 105 instructions use two independent carry chains and therefore can be executed in parallel or as soon as their respective data inputs are available.

The processor 100 also includes execution logic 109. The execution logic 109 is operable to execute or process the instructions of the instruction set 102. The execution logic 109 may include execution units, functional units, arithmetic logic units, logic units, arithmetic units, etc. The processor 100 also includes a decoder 129 to decode macroinstructions into microinstructions or micro-ops for execution by the execution logic 109.

Figure 2:
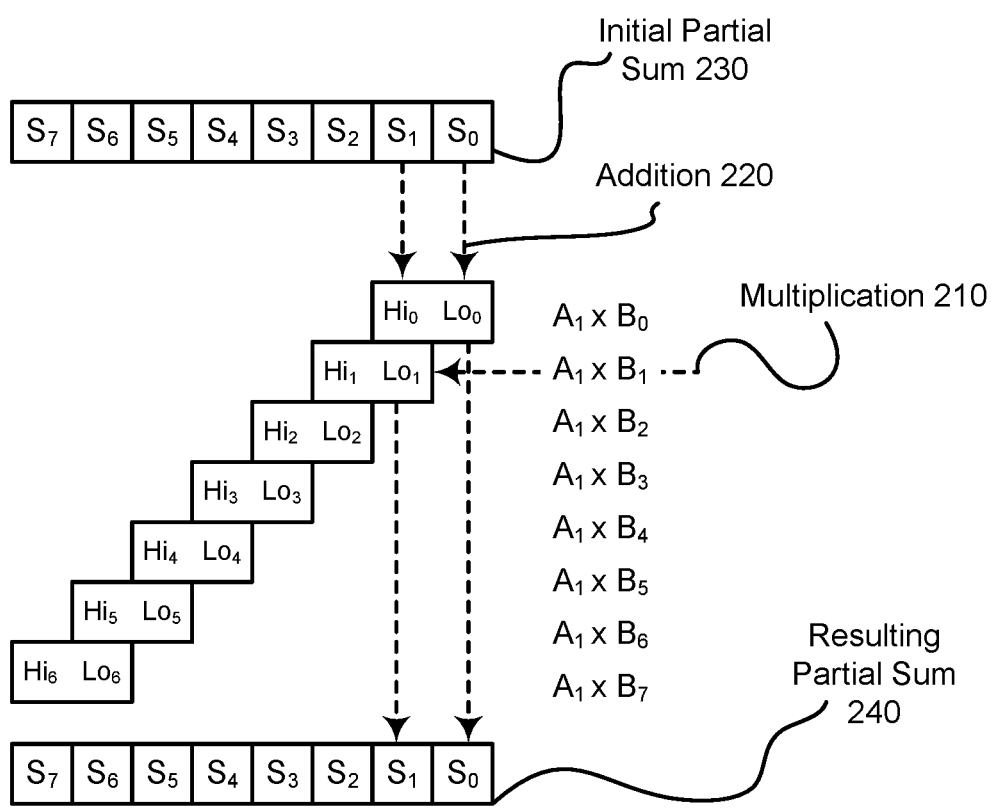
FIG. 2 illustrates an example of a multiplication operation that includes addition operations.

To further explain embodiments of the addition instructions 103, it may be helpful to consider an example scenario in which the additions are needed. FIG. 2 is a diagram illustrating an example scenario of calculating the expression $(S[7:0]=A_i \times B[7:0]+S[7:0])$, where $A_i$ is a Qword, and each $B_n$ and $S_n$ (n=0, 1, ... 7) is also a Qword. Each Qword is 64 bits wide. In FIG. 2, S[7:0] on the top (indicated as 230) is the initial partial sum, and the S[7:0] on the bottom (indicated as 240) is the resulting partial sum. For each multiply operation 210 ($A_i \times B_n$, n=0, 1, ... 7), a product of (64×64)=128 bits is generated. Each product is indicated as ($Hi_n$:$Lo_n$), shown as an entry in the diagonal of the diagram, where $Hi_n$ is the high-order part (i.e., the most significant half) and $Lo_n$ is the low-order part (i.e., the least significant half). This product can be added to a partial sum $S_n$ with a minimal number of micro-operations (pops) and latencies. One way of adding the product to the partial sum takes 2 addition operations, with each addition operation using one independent carry chain:

$$S_n = S_n + Lo_n \quad \text{(Equation 1)},$$

$$S_n = S_n + Hi_{n-1} \quad \text{(Equation 2)}.$$

Assume that S[7:0] is initialized to all zeros. Following the example addition operation 220 indicated by the vertical dotted line shown in FIG. 2, the addition operations are equivalent to: $S_0=S_0+Lo_0$, $S_1=S_1+Lo_1+Hi_0$, $S_2=S_2+Lo_2+Hi_1$, $S_3=S_3+Lo_3+Hi_2$, etc.

In the example of FIG. 2, $A_i$ is multiplied with $B_n$, n=0, 1, ... 7, where $A_i$ can be part of a first long integer A, and each of $B_n$ can be part of a second long integer B. The multiplication uses $S_n$, n=0, 1, ... 7, to store the partial sums. After the multiplication operations of ($A_0 \times B_n$, n=0, 1, ... 7), the computations can move on to $A_1 \times B_n$, $A_2 \times B_n$, and so on, until all parts of the long integer A are processed. Each of the multiplication operations can use $S_n$ to accumulate the partial sum. At the end, S[7:0] 240 has the final result.

Embodiments of the invention provide the addition instructions 103 that can be performed efficiently. In particular, in a processor that has multiple arithmetic logic units (ALUs), the additions in (Equation 1) and (Equation 2) can be performed by two different ALUs in parallel, or as soon as their respective data inputs ($Lo_n$, $Hi_{n-1}$) are available. In one embodiment, the addition in (Equation 1) can be performed by one of the ADCX 104/ADOX 105 instructions, and the addition in (Equation 2) can be performed by the other of the ADCX 104/ADOX 105 instructions.

In one embodiment, the ADCX 104 does not modify arithmetic flags other than the CF (carry flag) and the ADOX 105 does not modify arithmetic flags other than the OF (overflow flag). That is, the ADCX 104 reads and writes the CF flag only and leaves other flags unchanged, and the ADOX 105 reads and writes the OF flag only and leaves other flags unchanged. By limiting each addition instruction to access one flag only, two or more such addition instructions (each accessing a different flag) can be defined and executed without any data dependency. This is in contrast to existing addition instructions that overwrite multiple or all of the arithmetic flags, and therefore cannot be executed independently of each other.

In an alternative embodiment, the ADCX 104 and the ADOX 105 use their respective associated flags (i.e., CF and OF, respectively) for carry input and carry output, and do not modify each other's associated flag. However, ADCX 104 and ADOX 105 may also modify the other arithmetic flags (e.g., SF, PF, AF, ZF, etc.); e.g., by setting them to zero or another predetermined value.

In one embodiment, embodiments of the addition instructions are defined as follows:

The ADCX 104:

$CF$: regdst=reg1+reg2+$CF$; and

The ADOX 105:

$OF$: regdst=reg1+reg2+$OF$.

Although the flags CF and OF are described throughout the description, it should be understood that any two different arithmetic flags in the flags register of a processor can be used for the addition operations of (Equation 1) and (Equation 2). Further, as mentioned above, other addition instructions can also be similarly defined using different arithmetic flags; e.g., an ADAX instruction can be defined to read and write the AF flag only and leaves other flags unchanged, an ADPX instruction can be defined to read and write the PF flag only and leaves other flags unchanged, and the like. The data widths of reg1, reg2 and regdst are the same and can be any size. In some embodiments, the destination regdst can be the same as reg1 or reg2 (that is, the sum can overwrite one of the source registers).

Figures 3, 4:
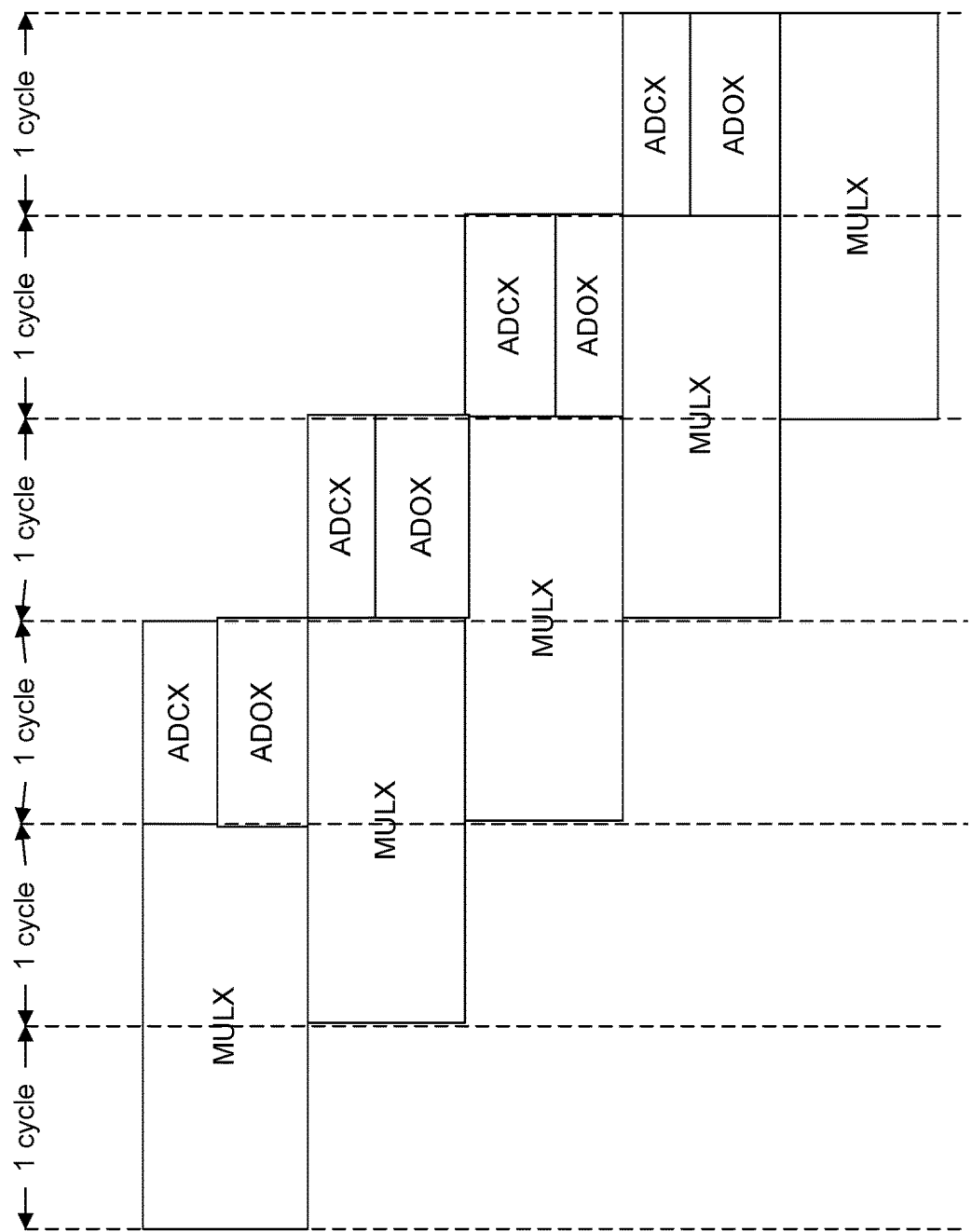
FIG. 3 illustrates an example of sample code that includes addition instructions.
FIG. 4 illustrates an embodiment of parallel execution of addition instructions.

FIG. 3 is an example of sample code 300 that includes ADCX and ADOX (e.g., the ADCX 104 and the ADOX 105 of FIG. 1) in the multiplication of two long numbers A[0:N−1]×B[0:N−1]. Each of the $A_n$ and $B_n$ (n=0 ..., N−1) is a Qword (although a different data width can be used). The sample code 300 breaks down the computation into a sequence of $A_i$×B[0:N−1] (i=0 ... N−1), such as the diagonal sequence in the diagram of FIG. 2. The computation can be grouped into a sequence of MULX, ADCX and ADOX. In one embodiment where the data width is 64 bits, the MULX instruction is defined to perform unsigned multiplication of a 64-bit number with another 64-bit number (stored in a RDX register that served as an implicit operand), without affecting any arithmetic flags.

MULX: r64a, r64b, r/m64, where r64a indicates a first 64-bit register that stores the most significant half of the multiplication product, r64b indicates a second 64-bit register that stores the least significant half of the multiplication product, and r/m64 indicates a 64-bit register or memory location that serves as an input to the multiplication. At the start of the sample code 300, it is assumed that the 64-bit value $A_i$ is assigned to the RDX register and an XOR is performed to clear all of the arithmetic flags. In one embodiment, each of rax, rbx and RDX is a 64-bit register, such as a general-purpose register.

Using the example of FIG. 2, the sample code 300 corresponds to the following operations:

$Hi_0: Lo_0 = A_i \times B_0$ $CF: S_0 = S_0 + Lo_0 + CF$ $OF: S_1 = S_1 + Hi_0 + OF$ $Hi_1: Lo_1 = A_i \times B_1$ $CF: S_1 = S_1 + Lo_1 + CF$ $OF: S_2 = S_2 + Hi_1 + OF$ $Hi_2: Lo_2 = A_i \times B_2$ $CF: S_2 = S_2 + Lo_2 + CF$ $OF: S_3 = S_3 + Hi_2 + OF$ Since ADCX and ADOX uses two different flags, they can be executed in parallel or as soon as their respective data inputs are available. In some embodiments with 3 dispatch ports (i.e., 3 ALUs), a single µop MULX, a single µop ADCX and a single µop ADOX can achieve maximum throughput of 1 cycle per multiplication triplet (i.e., the triplet MULT/ADCX/ADOX), given that the MULX, ADCX and ADOX are on different ALUs, all with throughput of 1. In another embodiment, MULX takes 2 µops and one µop each for the ADCX and ADOX. Thus, at least 4 ALUs are needed to achieve the maximum throughput of 1 cycle per multiplication triplet, assuming all on different ALUs with a throughput of 1. The MULX, ADCX and ADOX can work on machines with fewer ALUs, but max performance will not be achieved.

FIG. 4 is a block diagram illustrating an embodiment of parallel processing of the multiplication triplet. The diagram shows that during each cycle, a MULT can start executing. As the execution continues, in each cycle (e.g., 1 µtop) a new MULT can start executing simultaneously with a pair of ADCX and ADOX (e.g., as shown in each of the cycles 3-6). In particular, the ADCX and the ADOX can be processed during the same cycle in parallel. As long as there are sufficient number of ALUs to support the start of a new MULT at each cycle, the length of MULT can take any number of cycles (e.g., one, two, or more) and the throughput of one cycle per triplet can be achieved regardless of the length of the MULT operation.

The example of FIG. 4 shows that the ADCX and ADOX are executed in parallel in the same cycle. However, the two instructions can be executed at different cycles as soon as their respective data inputs are available. As there is no data dependency (i.e., carry input/output) dependency between the two instructions, the ADCX/ADOX can be executed as soon the most significant half/the least significant half of their associated multiplication result is available. For example, if the least significant half of the multiplication result is generated in the n-th cycle, and the most significant half of the multiplication result is generated in the (n+1)-th cycle, the ADCX and ADOX that consume these results can be executed as early as possible following the cycles when their respective last sources are available (i.e., in the consecutive cycles (N+1)-th and (N+2)-th cycles, respectively). That is, the ADCX and ADOX can be executed without any data dependency, in parallel or in any order.

Figure 5:
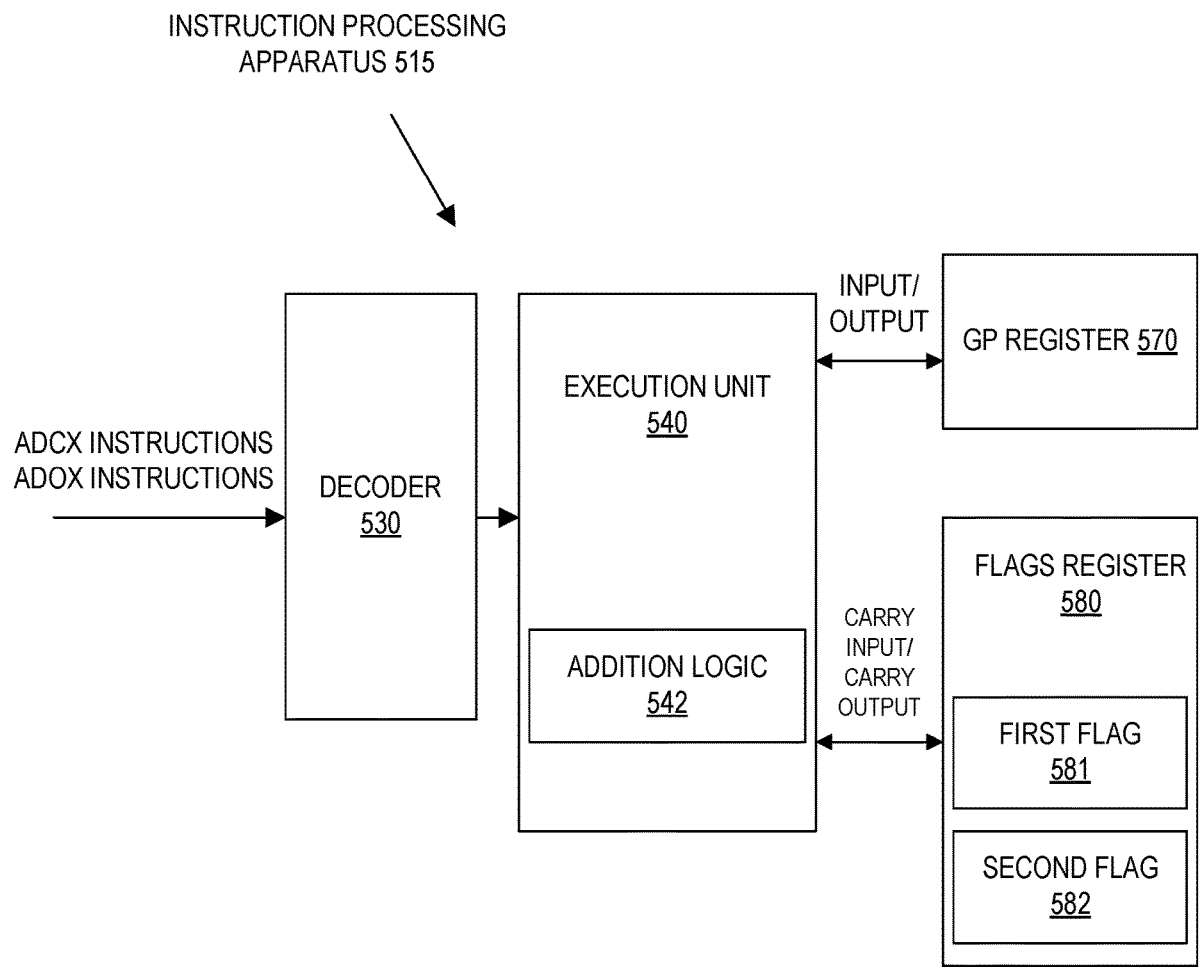
FIG. 5 is a block diagram of an example embodiment of an instruction processing apparatus having an execution unit that is operable to execute instructions including an example embodiment of addition instructions.

FIG. 5 is a block diagram of an embodiment of an instruction processing apparatus 515 having an execution unit 540 that is operable to execute instructions including an example embodiment of the addition instructions 103 of FIG. 1. In some embodiments, the instruction processing apparatus 515 may be a processor and/or may be included in a processor (e.g., the processor 100 of FIG. 1, or one similar). Alternatively, the instruction processing apparatus 515 may be included in a different processor, or electronic system.

The instruction processing apparatus 515 receives one or more of the addition instructions 103 (e.g., the ADCX 104 and the ADOX 105 of FIG. 1). A decoder 530, which can be the decoder 129 of FIG. 1 or one similar, receives the instructions in the form of higher-level machine instructions or macroinstructions, and decodes them to generate lower-level micro-operations, micro-code entry points, microinstructions, or other lower-level instructions or control signals, which reflect and/or are derived from the original higher-level instruction. The lower-level instructions or control signals may implement the operation of the higher-level instruction through lower-level (e.g., circuit-level or hardware-level) operations. The decoder 530 may be implemented using various different mechanisms. Examples of suitable mechanisms include, but are not limited to, micro-code random access memories (ROMs), look-up tables, hardware implementations, programmable logic arrays (PLAs), other mechanisms used to implement decoders known in the art, etc. In some embodiments of microarchitectures, macro-instructions can be executed directly without first being decoded by a decoder.

The execution unit 540 is coupled to the decoder 530. The execution unit 540 may receive from the decoder 530 one or more micro-operations, micro-code entry points, microinstructions, other instructions, or other control signals, which reflect, or are derived from the received addition instructions 103. The execution unit 540 includes addition logic 542 to perform additions.

The execution unit 540 also receives input from registers, such as general-purpose (GP) registers 570. The execution unit 540 receives carry input from a flags register 580, and stores carry output in the flags register 580. In one embodiment, a first addition instruction (e.g., the ADCX 104) uses a first flag 581 for carry input and carry output, and a second addition instruction (e.g., the ADOX 105) uses a second flag 582 for carry input and carry output. As described above, more addition instructions can be provided that each uses a different flag for carry input and carry output.

To avoid obscuring the description, a relatively simple instruction processing apparatus 515 has been shown and described. It is to be appreciated that other embodiments may have more than one execution unit. For example, the apparatus may include multiple different types of execution units, such as, for example, arithmetic units, arithmetic logic units (ALUs), integer units, floating point units, etc. At least one of these units may be responsive to an embodiment of a loop alignment instruction as disclosed herein. Still other embodiments of instruction processing apparatus or processors may have multiple cores, logical processors, or execution engines. An execution unit operable to execute one or more loop alignment instructions may be included within at least one, at least two, most, or all of the cores, logical processors, or execution engines.

The instruction processing apparatus 515 or processor may also optionally include one or more other well-known components. For example, other embodiments may include one or more of instruction fetch logic, scheduling logic, branch prediction logic, instruction and data caches, instruction and data translation lookaside buffers, prefetch buffers, microinstruction queues, microinstruction sequencers, bus interface units, second or higher level caches, instruction scheduling logic, retirement logic, register renaming logic, and the like, and various combinations thereof. It is to be appreciated that there are literally numerous different combinations and configurations of such components in processors, and that the scope of the invention is not limited to any known such combination or configuration.

Figure 6:
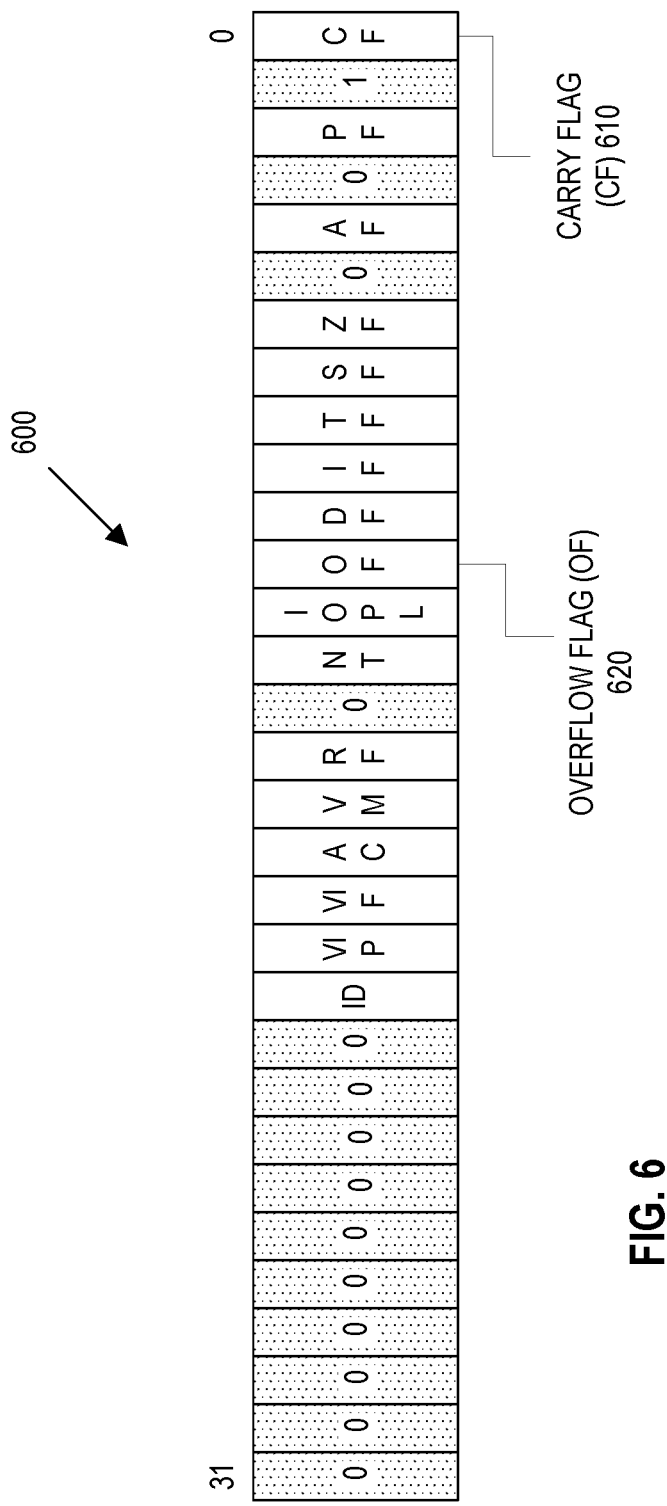
FIG. 6 illustrates an embodiment of a flags register.

FIG. 6 illustrates an EFLAGS register 600 representing an example embodiment of a flags register having a plurality of flags. In one embodiment, the EFLAGS register 600 is a 32-bit register that includes a group of status flags (also referred to as arithmetic flags, such as COSPAZ flags), a control flag, and a group of system flags.

The status flags include a carry flag (CF, bit 0) 610, a parity flag (PF, bit 2), an auxiliary carry flag (AF, bit 4), a zero flag (ZF, bit 6), a sign flag (SF, bit 7), and an overflow flag (OF, bit 11) 620. As previously mentioned, in one or more embodiments, the carry flag (CF, bit 0) and the overflow flag (OF, bit 11) may be used as the first and second flags 581, 582 associated with the addition instructions as disclosed herein. The CF and OF are emphasized for this reason, although use of these particular flags is not required.

The system flags include a trap flag (TF, bit 8), an interrupt enable flag (IF, bit 9), an I/O privileged level (IOPL, bits 12-13), a nested task (NT, bit 14), a resume flag (RF, bit 16), a virtual-8086 mode (VM, bit 17), an alignment check (AC, bit 18), a virtual interrupt flag (VIF, bit 19), a virtual interrupt pending (VIP, bit 20), and an ID flag (ID, bit 21). The control flag includes a direction flag (DF, bit 10). Bits 22-31 of EFLAGS are reserved.

The EFLAGS register 600 is one particular example embodiment of a register having suitable flags for implementing one or more embodiments, although this particular register and these particular flags are certainly not required.

Figure 7:
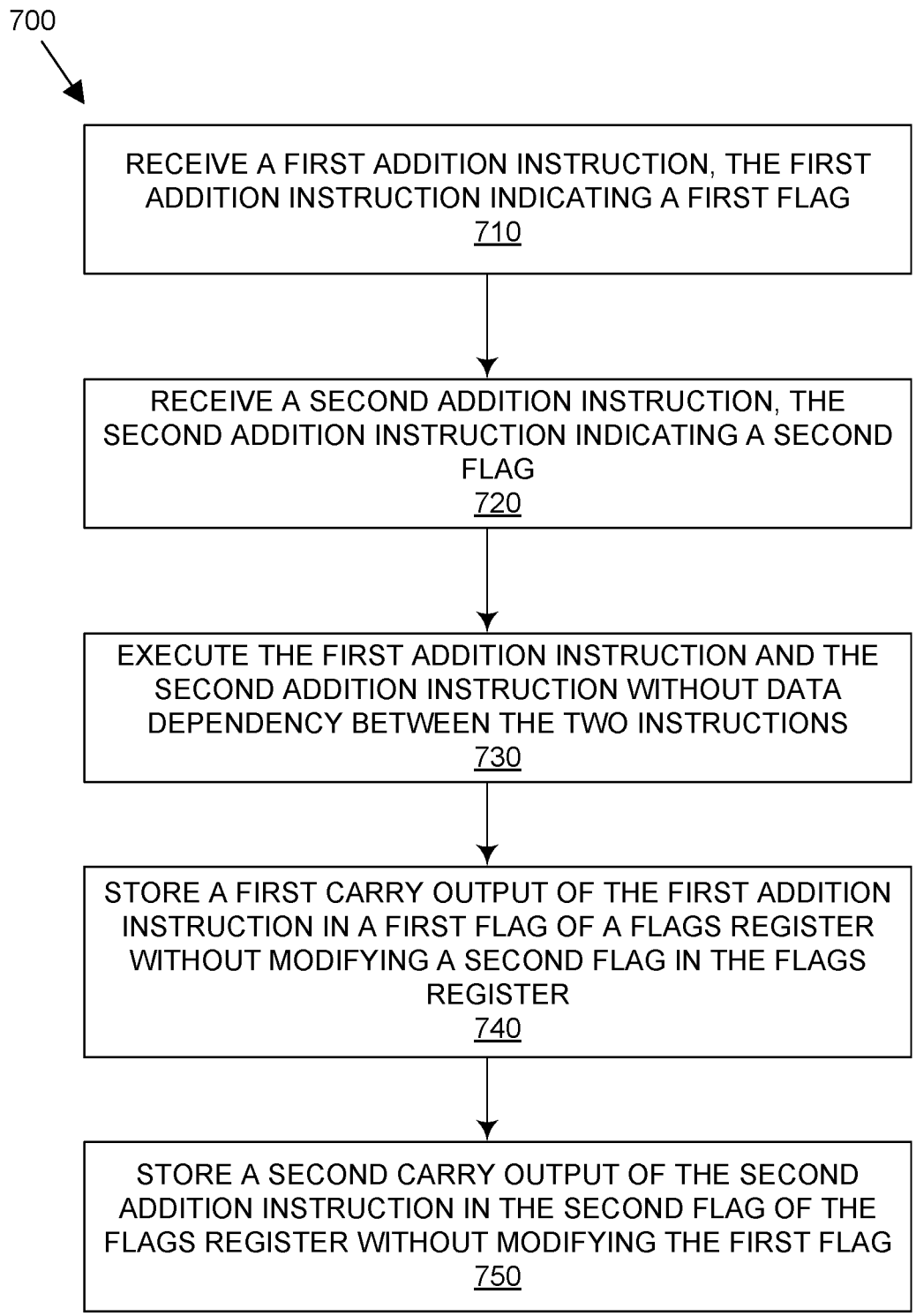
FIG. 7 is a flow diagram illustrating example embodiments of a method for processing addition instructions.

FIG. 7 is a flow diagram of an example embodiment of a method 700 of processing an example embodiment of an addition instruction (such as the addition instructions 103 of FIG. 1). In various embodiments, the method 700 may be performed by a general-purpose processor, a special-purpose processor (e.g., a graphics processor or a digital signal processor), or another type of digital logic device or instruction processing apparatus. In some embodiments, the method 700 may be performed by the processor 100 of FIG. 1, or the instruction processing apparatus 515 of FIG. 5, or a similar processor or instruction processing apparatus. Alternatively, the method 700 may be performed by different embodiments of processors or instruction processing apparatus. Moreover, the processor 100 of FIG. 1, and the instruction processing apparatus 515 of FIG. 5, may perform embodiments of operations and methods either the same as, similar to, or different than those of the method 700.

In one embodiment, the method 700 includes a processor receiving a first addition instruction (block 710). The first addition instruction indicates a first flag in a flags register. The processor then receives a second addition instruction (block 720). The second addition instruction indicates a second flag in the flags register. The first addition instruction and the second addition instruction are executed without data dependency between the first addition instruction and the second addition instruction (block 730). The processor stores the carry output from the first addition instruction in the first flag without modifying the second flag in the flags register (block 740). The processor also stores the carry output from the second addition instruction in the second flag without modifying the first flag in the flags register (block 750).

The illustrated method includes operations that are visible from outside a processor or instruction processing apparatus (e.g., from a software perspective). In other embodiments, the method may optionally include one or more other operations (e.g., one or more operations occurring internally within the processor or instruction processing apparatus). By way of example, after the instruction is received, the instruction may be decoded, translated, emulated, or otherwise converted, into one or more other instructions or control signals.

Exemplary Computer Systems and Processors—FIGS. 8-12

FIGS. 8-12 are exemplary computer systems and processors. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 8:
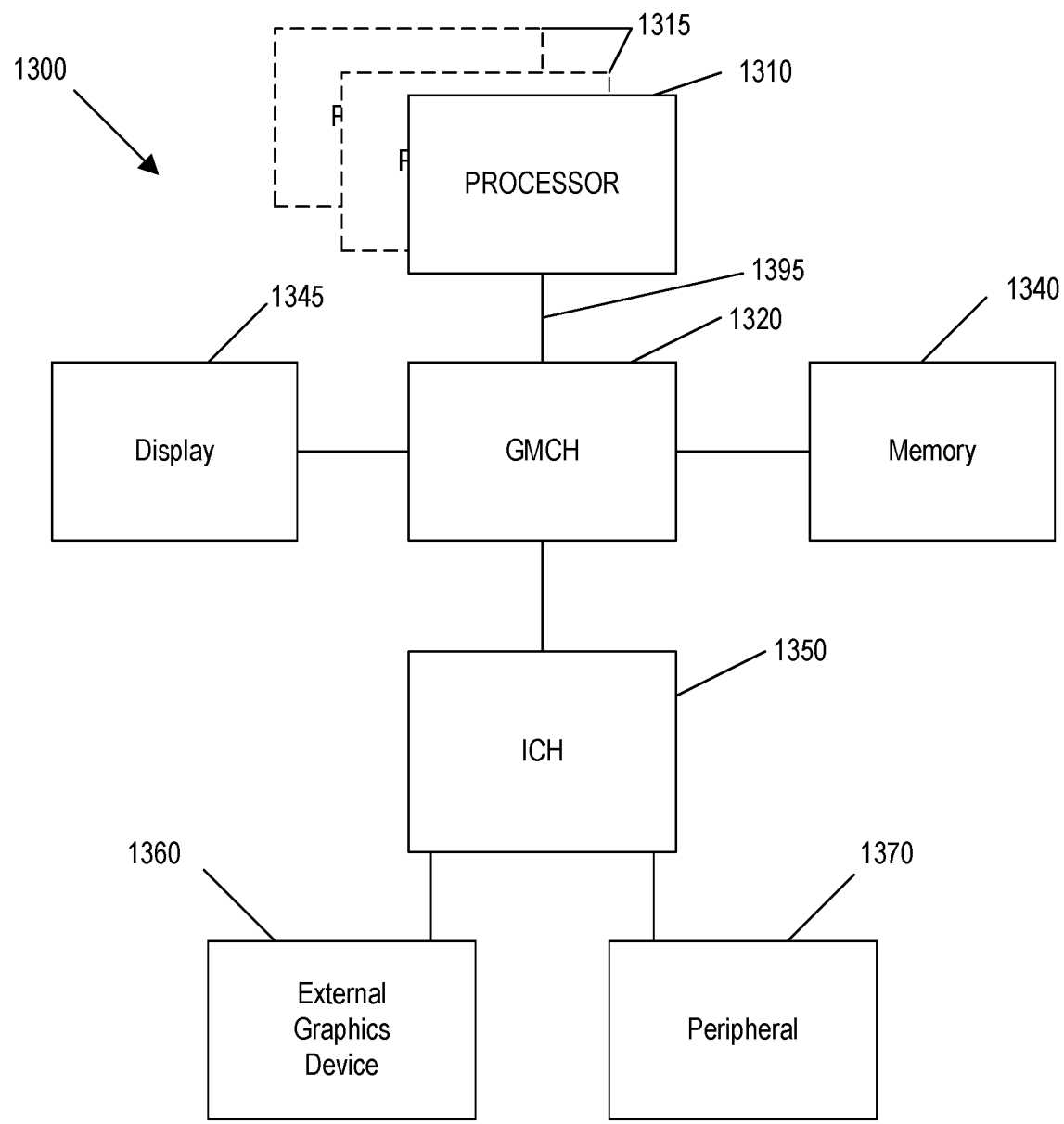
FIG. 8 is a block diagram of a system in accordance with one embodiment of the invention.

Referring now to FIG. 8, shown is a block diagram of a system 1300 in accordance with one embodiment of the invention. The system 1300 may include one or more processors 1310, 1315, which are coupled to graphics memory controller hub (GMCH) 1320. The optional nature of additional processors 1315 is denoted in FIG. 8 with broken lines.

Each processor 1310, 1315 may be some version of processor 1700. However, it should be noted that it is unlikely that integrated graphics logic and integrated memory control units would exist in the processors 1310, 1315.

FIG. 8 illustrates that the GMCH 1320 may be coupled to a memory 1340 that may be, for example, a dynamic random access memory (DRAM). The DRAM may, for at least one embodiment, be associated with a non-volatile cache.

The GMCH 1320 may be a chipset, or a portion of a chipset. The GMCH 1320 may communicate with the processor(s) 1310, 1315 and control interaction between the processor(s) 1310, 1315 and memory 1340. The GMCH 1320 may also act as an accelerated bus interface between the processor(s) 1310, 1315 and other elements of the system 1300. For at least one embodiment, the GMCH 1320 communicates with the processor(s) 1310, 1315 via a multi-drop bus, such as a frontside bus (FSB) 1395.

Furthermore, GMCH 1320 is coupled to a display 1345 (such as a flat panel display). GMCH 1320 may include an integrated graphics accelerator. GMCH 1320 is further coupled to an input/output (I/O) controller hub (ICH) 1350, which may be used to couple various peripheral devices to system 1300. Shown for example in the embodiment of FIG. 8 is an external graphics device 1360, which may be a discrete graphics device coupled to ICH 1350, along with another peripheral device 1370.

Alternatively, additional or different processors may also be present in the system 1300. For example, additional processor(s) 1315 may include additional processors(s) that are the same as processor 1310, additional processor(s) that are heterogeneous or asymmetric to processor 1310, accelerators (such as, e.g., graphics accelerators or digital signal processing (DSP) units), field programmable gate arrays, or any other processor. There can be a variety of differences between the processors 1310, 1315 in terms of a spectrum of metrics of merit including architectural, micro-architectural, thermal, power consumption characteristics, and the like. These differences may effectively manifest themselves as asymmetry and heterogeneity amongst the processing elements 1310, 1315. For at least one embodiment, the various processing elements 1310, 1315 may reside in the same die package.

Figure 9:
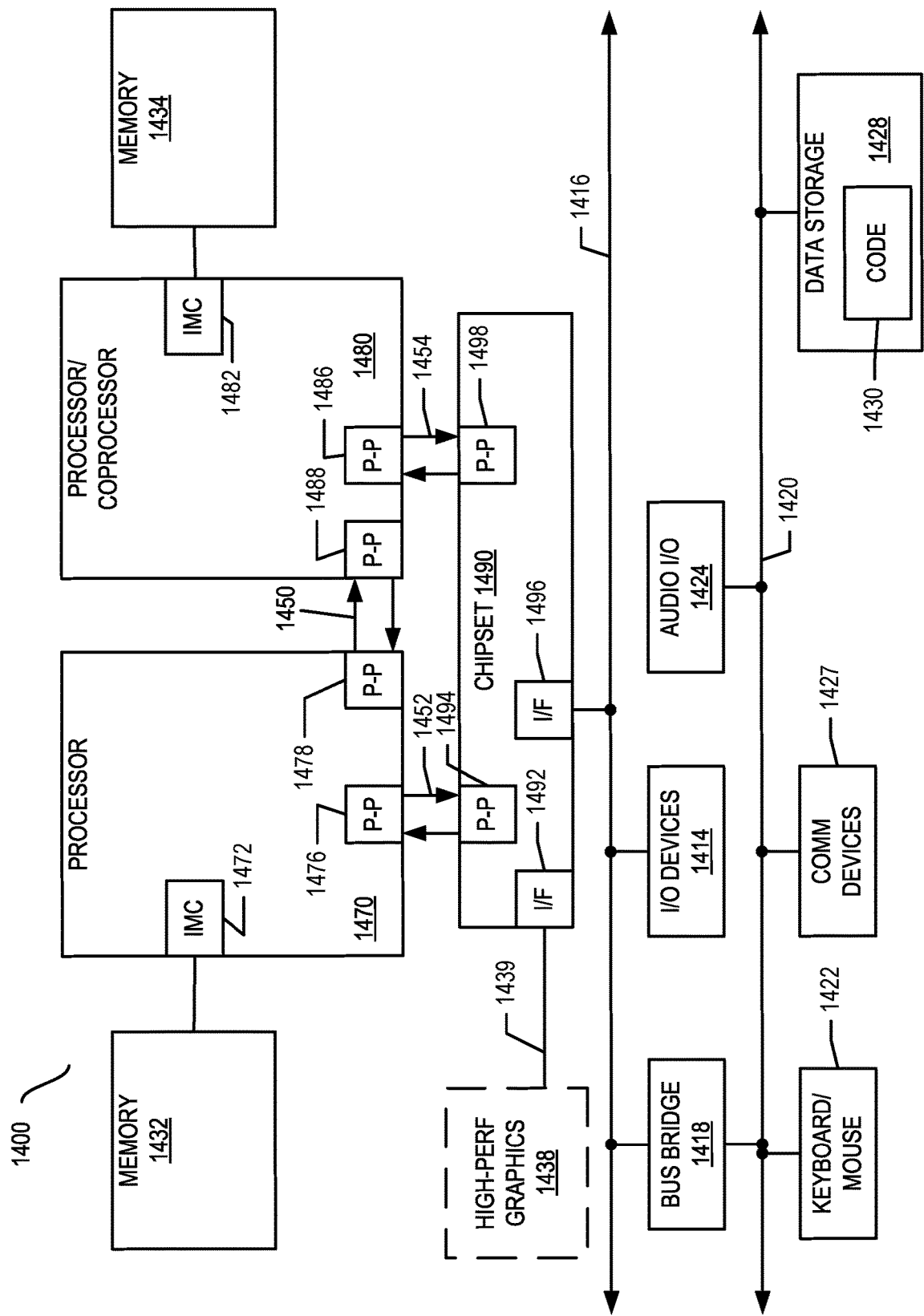
FIG. 9 is a block diagram of a second system in accordance with an embodiment of the invention.

Referring now to FIG. 9, shown is a block diagram of a second system 1400 in accordance with an embodiment of the present invention. As shown in FIG. 9, multiprocessor system 1400 is a point-to-point interconnect system, and includes a first processor 1470 and a second processor 1480 coupled via a point-to-point interconnect 1450. As shown in FIG. 9, each of processors 1470 and 1480 may be some version of the processor 1700.

Alternatively, one or more of processors 1470, 1480 may be an element other than a processor, such as an accelerator or a field programmable gate array.

While shown with only two processors 1470, 1480, it is to be understood that the scope of the present invention is not so limited. In other embodiments, one or more additional processing elements may be present in a given processor.

Processor 1470 may further include an integrated memory controller hub (IMC) 1472 and point-to-point (P-P) interfaces 1476 and 1478. Similarly, second processor 1480 may include an IMC 1482 and P-P interfaces 1486 and 1488. Processors 1470, 1480 may exchange data via a point-to-point (PtP) interface 1450 using PtP interface circuits 1478, 1488. As shown in FIG. 9, IMC's 1472 and 1482 couple the processors to respective memories, namely a memory 1432 and a memory 1434, which may be portions of main memory locally attached to the respective processors.

Processors 1470, 1480 may each exchange data with a chipset 1490 via individual P-P interfaces 1452, 1454 using point to point interface circuits 1476, 1494, 1486, 1498. Chipset 1490 may also exchange data with a high-performance graphics circuit 1438 via a high-performance graphics interface 1492.

A shared cache (not shown) may be included in either processor outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 9, various I/O devices 1414 may be coupled to first bus 1416, along with a bus bridge 1418 which couples first bus 1416 to a second bus 1420. In one embodiment, second bus 1420 may be a low pin count (LPC) bus. Various devices may be coupled to second bus 1420 including, for example, a keyboard/mouse 1422, communication devices 1427 and a data storage unit 1428 such as a disk drive or other mass storage device which may include code 1430, in one embodiment. Further, an audio I/O 1424 may be coupled to second bus 1420. Note that other architectures are possible. For example, instead of the point-to-point architecture of FIG. 9, a system may implement a multi-drop bus or other such architecture.

Figure 10:
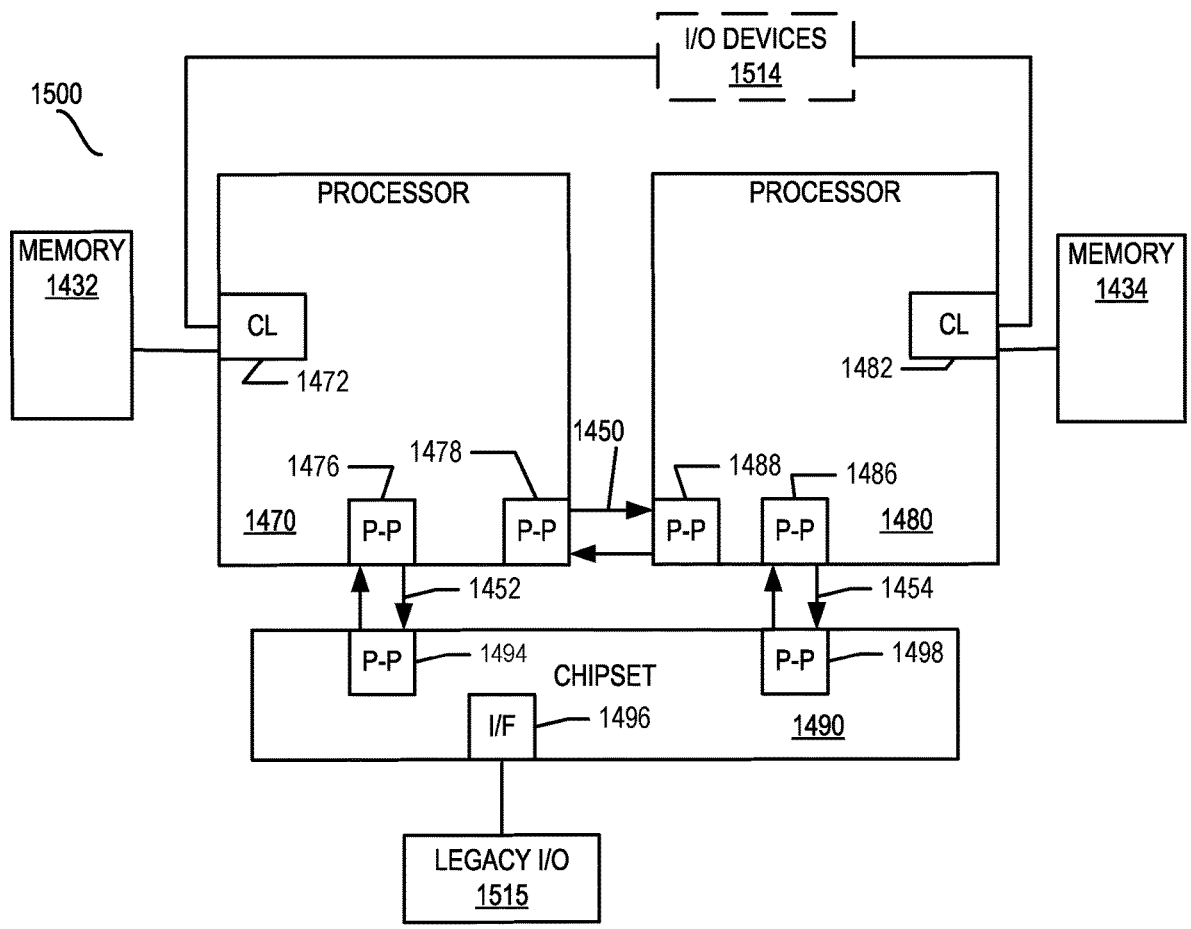
FIG. 10 is a block diagram of a third system in accordance with an embodiment of the invention.

Referring now to FIG. 10, shown is a block diagram of a third system 1500 in accordance with an embodiment of the present invention. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processing elements 1470, 1480 may include integrated memory and I/O control logic ("CL") 1472 and 1482, respectively. For at least one embodiment, the CL 1472, 1482 may include memory controller hub logic (IMC) such as that described above in connection with FIG. 9. In addition, CL 1472, 1482 may also include I/O control logic. FIG. 10 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 11:
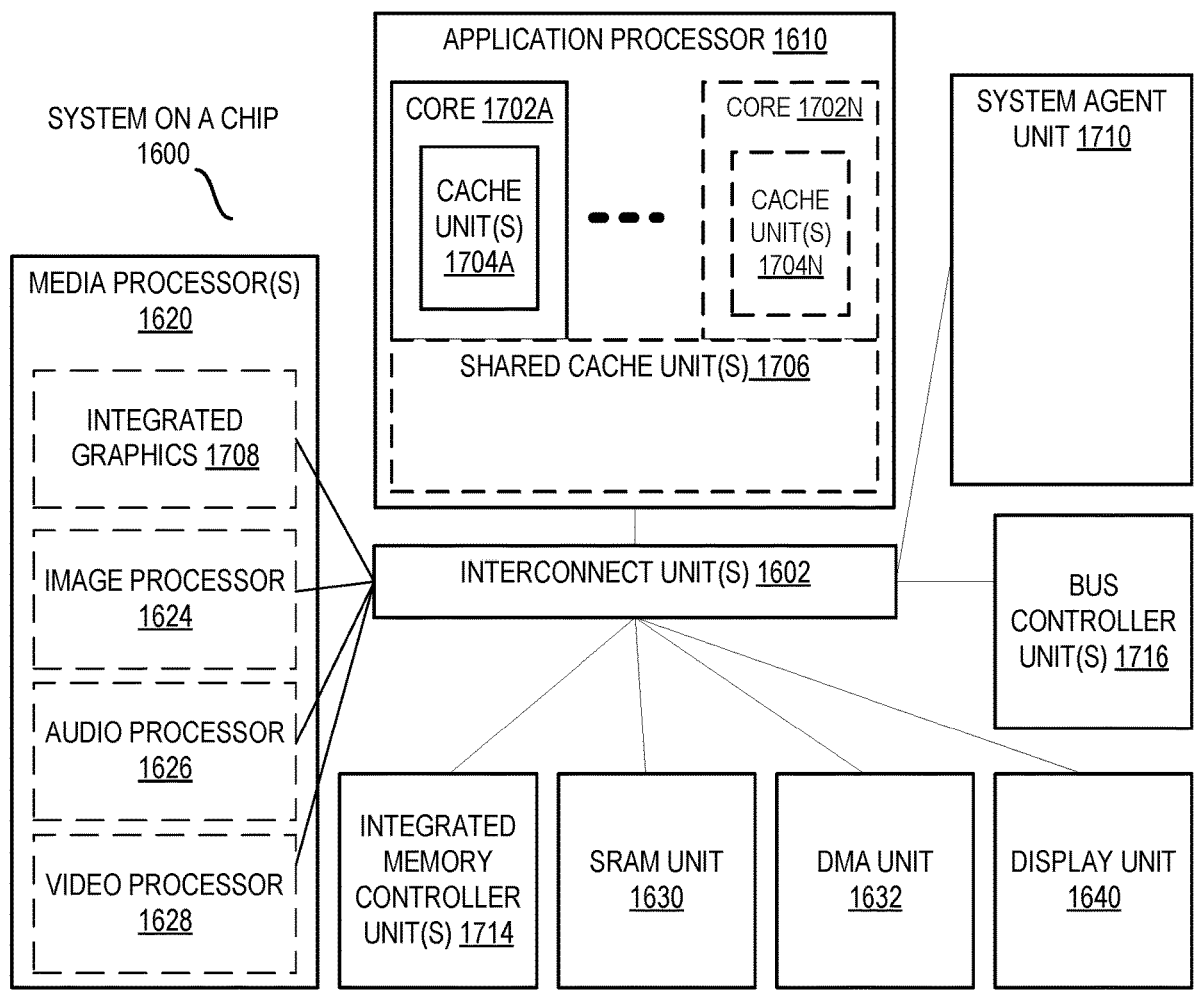
FIG. 11 is a block diagram of a system-on-a-chip (SoC) in accordance with an embodiment of the invention.
Figure 12:
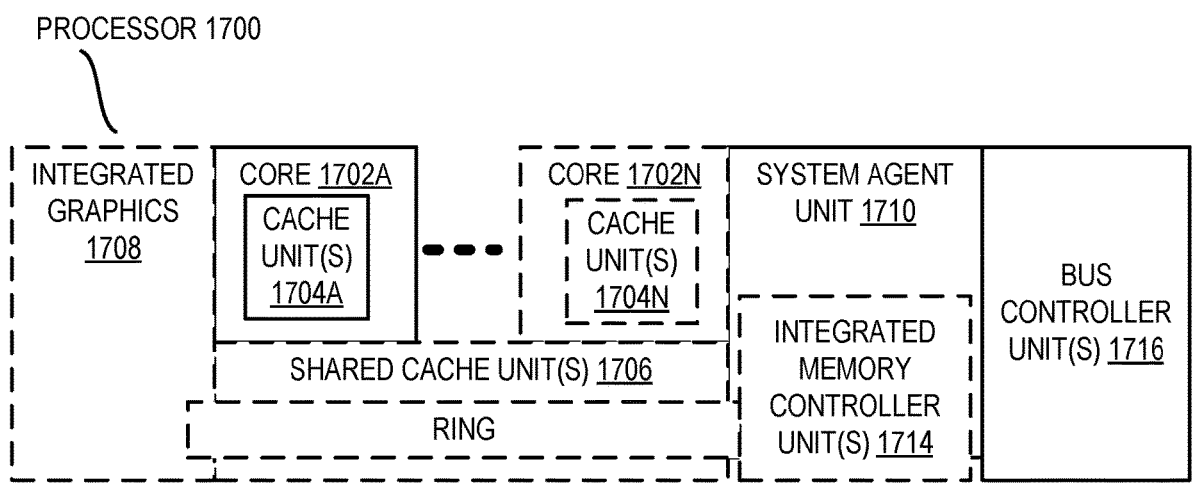
FIG. 12 is a block diagram of a single core processor and a multicore processor with integrated memory controller and graphics according to embodiments of the invention.

Referring now to FIG. 11, shown is a block diagram of a SoC 1600 in accordance with an embodiment of the present invention. Similar elements in FIG. 12 bear like reference numerals. Also, dashed lined boxes are optional features on more advanced SoCs. In FIG. 11, an interconnect unit(s) 1602 is coupled to: an application processor 1610 which includes a set of one or more cores 1702A-N, cache units 1704A-N, and shared cache unit(s) 1706; a system agent unit 1710; a bus controller unit(s) 1716; an integrated memory controller unit(s) 1714; a set or one or more media processors 1620 which may include integrated graphics logic 1708, an image processor 1624 for providing still and/or video camera functionality, an audio processor 1626 for providing hardware audio acceleration, and a video processor 1628 for providing video encode/decode acceleration; a static random access memory (SRAM) unit 1630; a direct memory access (DMA) unit 1632; and a display unit 1640 for coupling to one or more external displays.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input data to perform the functions described herein and generate output information.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks (compact disk read-only memories (CD-ROMs), compact disk rewritables (CD-RWs)), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 13:
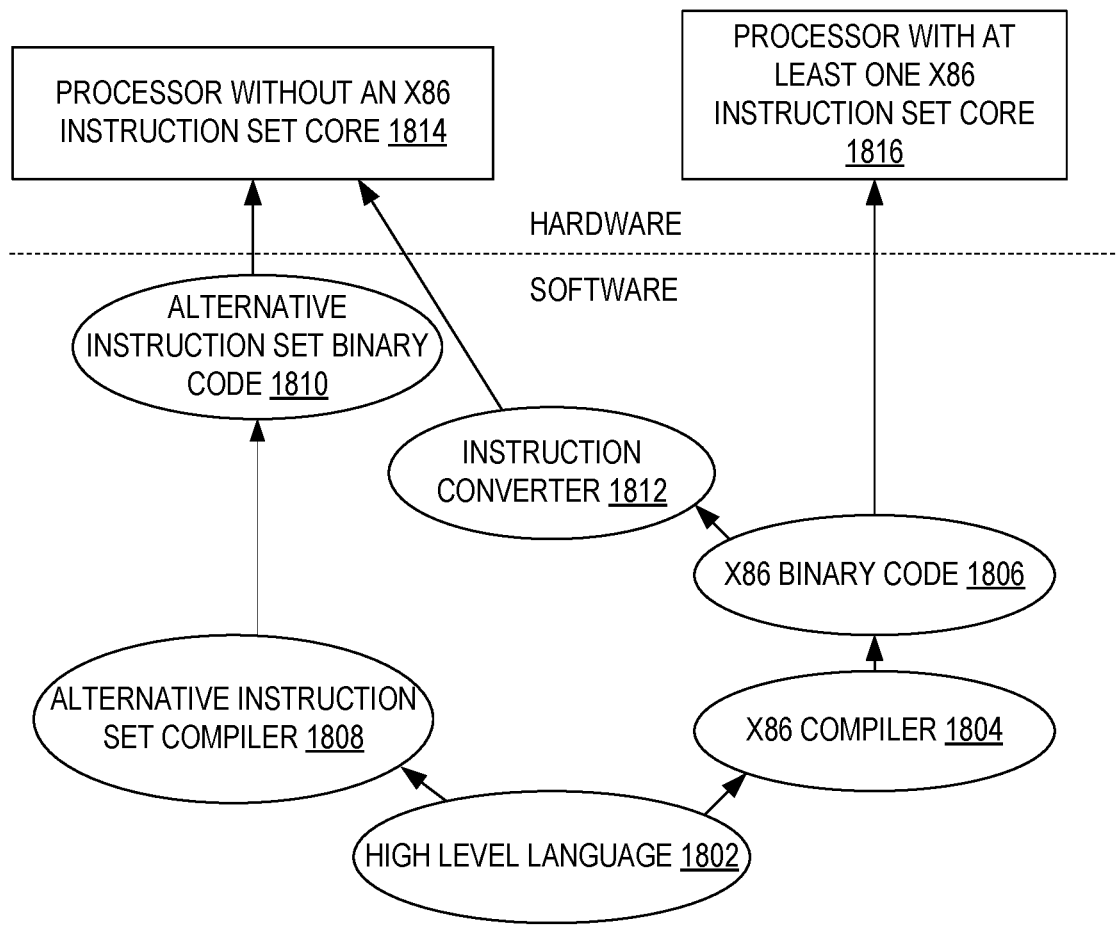
FIG. 13 is a block diagram contrasting the use of a software instruction converter to convert binary instructions in a source instruction set to binary instructions in a target instruction set according to embodiments of the invention.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1802 may be compiled using an x86 compiler 1804 to generate x86 binary code 1806 that may be natively executed by a processor with at least one x86 instruction set core 1816 (it is assumed that some of the instructions that were compiled are in a vector friendly instruction format). The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 13 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

Certain operations of the instruction(s) in the vector friendly instruction format disclosed herein may be performed by hardware components and may be embodied in machine-executable instructions that are used to cause, or at least result in, a circuit or other hardware component programmed with the instructions performing the operations. The circuit may include a general-purpose or special-purpose processor, or logic circuit, to name just a few examples. The operations may also optionally be performed by a combination of hardware and software. Execution logic and/or a processor may include specific or particular circuitry or other logic responsive to a machine instruction or one or more control signals derived from the machine instruction to store an instruction specified result operand. For example, embodiments of the instruction(s) disclosed herein may be executed in one or more the systems of FIGS. 8-12 and embodiments of the instruction(s) in the vector friendly instruction format may be stored in program code to be executed in the systems. Additionally, the processing elements of these figures may utilize one of the detailed pipelines and/or architectures (e.g., the in-order and out-of-order architectures) detailed herein. For example, the decode unit of the in-order architecture may decode the instruction(s), pass the decoded instruction to a vector or scalar unit, etc.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents. For example, one or more operations of a method may be combined or further broken apart.

Alternative Embodiments

While embodiments have been described which would natively execute the vector friendly instruction format, alternative embodiments of the invention may execute the vector friendly instruction format through an emulation layer running on a processor that executes a different instruction set (e.g., a processor that executes the MIPS instruction set of MIPS Technologies of Sunnyvale, Calif., a processor that executes the ARM instruction set of ARM Holdings of Sunnyvale, Calif.). Also, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
    hardware decoder circuitry to decode an instruction, the instruction to identify a location of a first operand and to identify a location of a second operand; and
    execution circuitry to execute the decoded instruction to perform an unsigned addition of the first operand, the second operand, and an overflow flag to generate a result, and store the result.

2. The apparatus of claim 1, wherein the identified location of the first operand is a register.

3. The apparatus of claim 1, wherein the execution circuitry is to update the overflow flag during execution of the decoded instruction.

4. The apparatus of claim 3, wherein the overflow flag is a flag of a flags register.

5. The apparatus of claim 4, wherein the execution circuitry is to not modify other arithmetic flags of the flags register during execution of the decoded instruction.

6. The apparatus of claim 1, wherein the result is to be stored in the identified location of the first operand.

7. A method comprising:
    decoding an instruction, the instruction to identify a location of a first operand and to identify a location of a second operand; and
    executing the decoded instruction to perform an unsigned addition of the first operand, the second operand, and an overflow flag to generate a result, and store the result.

8. The method of claim 7, wherein the identified location of the first operand is a register.

9. The method of claim 7, wherein the executing updates the overflow flag.

10. The method of claim 9, wherein the overflow flag is a flag of a flags register.

11. The method of claim 10, wherein the executing does not modify other arithmetic flags of the flags register.

12. The method of claim 7, wherein the result is stored in the identified location of the first operand.

13. A system comprising:
    a memory to store an instruction; and
    a processor coupled to the memory, the processor comprising:
        hardware decoder circuitry to decode the instruction, the instruction to identify a location of a first operand and to identify a location of a second operand, and
        execution circuitry to execute the decoded instruction to perform an unsigned addition of the first operand, the second operand, and an overflow flag to generate a result, and store the result.

14. The system of claim 13, wherein the identified location of the first operand is a register.

15. The system of claim 13, wherein the execution circuitry is to update the overflow flag during execution of the decoded instruction.

16. The system of claim 15, wherein the overflow flag is a flag of a flags register.

17. The system of claim 16, wherein the execution circuitry is to not modify other arithmetic flags of the flags register during execution of the decoded instruction.

18. The system of claim 13, wherein the result is to be stored in the identified location of the first operand.

* * * * *